(12) United States Patent
Sato et al.

(10) Patent No.: US 7,726,865 B2
(45) Date of Patent: Jun. 1, 2010

(54) BACKLIGHT UNIT AND LIQUID CRYSTAL DISPLAY DEVICE

(75) Inventors: Takashi Sato, Nara (JP); Hisashi Watanabe, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 228 days.

(21) Appl. No.: 11/994,890

(22) PCT Filed: Aug. 4, 2006

(86) PCT No.: PCT/JP2006/315508
§ 371 (c)(1),
(2), (4) Date: Jan. 7, 2008

(87) PCT Pub. No.: WO2007/020820
PCT Pub. Date: Feb. 22, 2007

(65) Prior Publication Data
US 2009/0122576 A1      May 14, 2009

(30) Foreign Application Priority Data
Aug. 12, 2005  (JP) .............................. 2005-234707

(51) Int. Cl.
*F21V 7/04*       (2006.01)
(52) U.S. Cl. ..................... 362/620; 362/607; 362/617; 362/619; 362/19; 362/561
(58) Field of Classification Search ................ 362/606, 362/607, 617, 619, 620, 623, 625, 19, 561
See application file for complete search history.

(56) References Cited

U.S. PATENT DOCUMENTS

| | | | | |
|---|---|---|---|---|
| 5,555,109 A | * | 9/1996 | Zimmerman et al. | 349/57 |
| 5,592,332 A | * | 1/1997 | Nishio et al. | 359/619 |
| 5,764,322 A | * | 6/1998 | Mamiya et al. | 349/65 |
| 5,914,760 A | | 6/1999 | Daiku | |
| 5,944,405 A | * | 8/1999 | Takeuchi et al. | 362/617 |
| 7,408,708 B2 | * | 8/2008 | Goto et al. | 359/456 |
| 2003/0137824 A1 | | 7/2003 | Shinohara et al. | |
| 2005/0002204 A1 | * | 1/2005 | Lin et al. | 362/551 |

FOREIGN PATENT DOCUMENTS

| | | |
|---|---|---|
| JP | 09-113908 A | 5/1997 |
| JP | 11-224058 A | 8/1999 |
| JP | 2004/271871 A | 9/2004 |
| WO | 97/26485 A1 | 7/1997 |

OTHER PUBLICATIONS

Official communication issued in the International Application No. PCT/JP2006/315508, mailed on Nov. 7, 2006.

* cited by examiner

*Primary Examiner*—Stephen F Husar
*Assistant Examiner*—James W Cranson
(74) *Attorney, Agent, or Firm*—Keating & Bennett, LLP

(57) ABSTRACT

A backlight unit includes a prism sheet (an optical path changing portion and a light gathering portion) having lenses and being disposed to face an output surface of a light guide member, and a plurality of second prism inclined surfaces that are inclined at a predetermined inclination angle with respect to the output surface. Further, a lens surface that gathers light from the second prism inclined surfaces toward a normal line direction of the output surface according to the second prism inclined surfaces is provided, and a central position of the lens surface in a transmitting direction of the light guide member is matched with a central position of its corresponding second prism inclined surface.

7 Claims, 9 Drawing Sheets

BACKLIGHT UNIT AND LIQUID CRYSTAL DISPLAY DEVICE

BACKGROUND OF THE INVENTION

1. Field of the Invention

The present invention relates to a backlight unit and a liquid crystal display device using the same.

2. Description of the Related Art

Liquid crystal display devices change optical anisotropy of a liquid crystal layer according to a voltage applied to the liquid crystal layer so as to change light transmittances thereof, and thereby displaying information such as character and image. Such liquid crystal display devices are mainly classified into three types: a transmission type; a reflection type; and a semi-transmission type, according to incident light for the display into the liquid crystal layer.

That is, in the liquid crystal display device of the transmission type, a backlight unit is disposed on a rear surface (non-display surface) side of a liquid crystal display element that is provided with the liquid crystal layer, and light from the backlight unit passes through the liquid crystal display element, whereby a user can visually recognize displayed information. Moreover, in the liquid crystal display device of the reflection type, incident light from a front surface is reflected by the liquid crystal display element, whereby a user can visually recognize displayed information.

Further, the liquid crystal display device of the semi-transmission type is designed to function similarly to the liquid crystal display device of the transmission type or the reflection type depending on an environment in which it is used. More specifically, the liquid crystal display device of the semi-transmission type displays by reflecting light from the outside in its environment in which the incident light from the outside is strong, similarly to the liquid crystal display device of the reflection type. Whereas, in an environment in which the incident light from the outside is weak, the backlight unit that is provided on the rear surface side of the liquid crystal display element is turned ON, so that the liquid crystal display device of the semi-transmission type display by using the light from the backlight unit, similarly to the liquid crystal display device of the transmission type. Further, some of the liquid crystal display devices of the semi-transmission type display in two modes including the transmission-type mode and the reflection-type mode at the same time, regardless of intensities of the incident light from the outside.

Moreover, a conventional liquid crystal display device, in which a backlight unit is provided with a prism sheet having a prism surface that is formed to have a sawtooth configuration, has been suggested (see, for example, JP 11(1999)-224058 A).

Here, the backlight unit provided in a first conventional example that is described in the above-described cited reference JP 11(1999)-224058 A will be explained specifically with reference to FIGS. 11A-11C.

As shown in FIG. 11A, a backlight unit 100 is provided with a planar light source device 101 that emits light with a flat shape (hereinafter, called "planar light"), and a prism sheet 104 and a reflecting plate 105 that are provided on an upper side and a lower side with respect to the planar light source device 101 in the figure, respectively, so that the planar light is incident into the liquid crystal display element (not illustrated) via the prism sheet 104.

The planar light source device 101 is provided with a light source 102 that emits light, a reflecting member 102a that is arranged so as to surround the light source 102, and a light guide member 103 having a wedge-shaped cross section that allows the light emitted by the light source 102 to be input therein and leads the input light toward a predetermined transmitting direction (illustrated as the arrow S1 in FIG. 11A). The reflecting member 102a reflects the light that is emitted by the light source 102 toward the light guide member 103, thereby allowing the light from the light source 102 to be incident into the light guide member 103 efficiently.

By also referring to FIG. 11B, the light guide member 103 is faces an output surface 103a that outputs the planar light toward the prism sheet 104 side, an inclined surface 103b that faces the reflecting plate 105 and is inclined by a predetermined inclination angle K1 with respect to the output surface 103a, and an input surface 103c from which the light from the light source 102 is input. In this light guide member 103, the light from the light source 102 that is input from the input surface 103c toward an inner side is repeatedly reflected by the output surface 103a and the inclined surface 103b or the reflecting plate 105 so as to be led toward the transmitting direction S1, and is output from the output surface 103a toward the prism sheet 104 appropriately.

In the prism sheet 104, a prism surface is arranged to face the output surface 103a of the light guide member 103 and is formed to have a sawtooth configuration. This prism surface is provided with a first prism inclined surface 104a and a second prism inclined surface 104b that are disposed alternately, and a ridge line 104c is formed on a boundary between these prism inclined surfaces 104a and 104b (see also FIG. 11C). Moreover, in the prism sheet 104, a vertical angle between the first and second prism inclined surfaces 104a and 104b is set as K2, as illustrated in FIG. 11C.

In the backlight unit 100 having the structure as described above, the light from the light source 102 is transmitted toward the transmitting direction S1 inside the light guide member 103. More specifically, when the light from the light source 102 that is input into the inside of the light guide member 103 is incident upon an interface between the output surface 103a and air at an incident angle that is smaller than a predetermined incident angle (total reflection angle), a portion of the light is refracted by the above-described interface and is output toward the prism sheet 104 side, and the remaining light is reflected by the interface toward the inner side of the light guide member 103, as shown by the arrows with the solid lines and the dotted lines in FIG. 11A. Moreover, the entire light incident upon the interface at an incident angle that is the total reflection angle or larger is reflected by the interface toward the inner side of the light guide member 103.

Moreover, the light that is output from the interface toward the prism sheet 104 side is incident upon the prism surface of the prism sheet 104, and is reflected by the second prism inclined surface 104b toward an upper side so as to be output from the prism sheet 104 as incident light into the liquid crystal display element, as shown by the arrows with the solid lines and the dotted lines in FIG. 11C.

Whereas, the light reflected by the interface between the output surface 103a and the air toward the inner side of the light guide member 103 travels toward the inclined surface 103b inside the light guide member 103, as shown by the arrow with the dotted line in FIG. 11A. Then, the light refracted by the interface between the inclined surface 103b and the air is output toward an outside of the light guide member 103, and is subsequently reflected by the reflecting plate 105 toward the light guide member 103 side. Further, this light passes through the inclined surface 103b so as to be incident into the light guide member 103 again, and is subsequently output from the output surface 103a toward the prism sheet 104 side so as to be output from the prism sheet 104 as the incident light, as shown by the arrows of the solid lines and the dotted lines in FIG. 11C.

As described above, in the backlight unit 100 in the first conventional example, the light that is output once from the inclined surface 103b of the light guide member 103 to the outside is reflected by the reflecting plate 105 toward the light guide member 103 side, so that the light output to the outside can be used for the display, thereby increasing an efficiency of utilizing the light from the light source 102. Moreover, in the backlight unit 100, by interposing the prism sheet 104, the light having high directivity with respect to the liquid crystal display element can be output.

Moreover, another conventional backlight unit, which is provided with a lens for gathering output light toward the liquid crystal display element at a position facing each of a plurality of prisms that are provided on a prism surface with a sawtooth configuration, is suggested (see, for example, JP 10(1998)-12024 A).

Here, the backlight unit of a second conventional example described in the above-described JP 10(1998)-12024 A will be described specifically with reference to FIGS. 12A-12C.

As shown in FIG. 12A, a backlight unit 200 is provided with a planar light source device 201 that emits planar light, and a prism sheet 204 that includes lenses for gathering light from the planar light source device 201 and outputting the light toward the outside, so that the backlight unit 200 allows the planar light to be incident into the liquid crystal display element, which is not illustrated, via the prism sheet 204.

The planar light source device 201 is provided with a light source 202 for emitting light, a reflecting member 202a that is arranged so as to surround the light source 202, and a light guide member 203 having a rectangular cross-section that allows the light emitted by the light source 202 to be input and leads the input light toward a predetermined transmitting direction (illustrated as the arrow S2 in FIG. 12A). The reflecting member 202a reflects the light emitted by the light source 202 toward the light guide member 203, thereby allowing the light from the light source 202 to be incident into the light guide member 203 efficiently.

By also referring to FIG. 12B, the light guide member 203 is provided with an output surface 203a that outputs the light from the light source 202 toward the prism sheet 204 side, a non-output surface 203b that is formed in parallel with this output surface 203a, and an input surface 203c from which the light from the light source 202 is input. On the output surface 203a, a prism surface having a sawtooth configuration is formed. That is, in the output surface 203a, a first inclined surface 203d that is formed to have a predetermined inclination angle K3 with respect to the output surface 203a, and a second inclined surface 203e that constitutes a prism having a isosceles triangular cross section with the first inclined surface 203d are provided, and a plurality of the prisms are provided along the transmitting direction S2. Then, in this light guide member 203, the light from the light source 202 that is input from the input surface 203c to the inside thereof is reflected repeatedly by the output surface 203a and the non-output surface 203b so as to be led toward the transmitting direction S2, and is output from the output surface 203a toward the prism sheet 204 appropriately.

The prism sheet 204 is disposed to face the output surface 203a of the light guide member 203, and is provided with a prism surface that is constituted of the plurality of the prisms so as to have a sawtooth configuration, and a plurality of lenses that are formed on an opposite side of the light guide member 203 of this prism surface and are disposed facing the liquid crystal display element. By also referring to FIG. 12C, each of the prisms of the prism surface is provided with a first prism inclined surface 204a and a second prism inclined surface 204b that are disposed alternately, and a ridge line 204c is formed on a boundary between these prism inclined surfaces 204a and 204b. Moreover, as shown in FIG. 12C, a vertical angle between the first and second prism inclined surfaces 204a and 204b is set as K5 in the prism sheet 204.

Moreover, in the prism sheet 204, a lens surface 204d having a semicircular cross section that protrudes toward the outer side is formed at a position facing the prism having the isosceles triangular cross section that is constituted of the prism inclined surfaces 204a and 204b. One end side and the other end side of each lens surface 204d are formed to be continuous to upper end sides of the prism inclined surfaces 204a and 204b, respectively, and a dimension of each lens surface 204d in the transmitting direction S2 is equal to a dimension of the prism in the transmitting direction S2. That is, in the prism sheet 204, the lens surface 204d that is included in each of the plurality of the lenses is provided for each of the plurality of the prisms that are arranged along the transmitting direction S2, thereby gathering the light reflected by the prism so as to output the light toward the liquid crystal display element side.

In the backlight unit 200 having the structure as described above, the light from the light source 202 is transmitted toward the transmitting direction S2 inside the light guide member 203. More specifically, when the light from the light source 202 that is input into the inside of the light guide member 203 is incident upon an interface between the output surface 203a and the air at an incident angle that is the total reflection angle or larger, which is shown as K4 in FIG. 12B, the light is reflected totally toward the inner side of the light guide member 203 as shown by the arrow with the solid line in FIG. 12B so as to travel in the transmitting direction S2.

Whereas, when the light is incident upon the second inclined surface 203e that is provided on the output surface 203a, the light is refracted by the inclined surface 203e so as to be output to the outside of the light guide member 203, as shown by the arrows with the dotted lines in FIG. 12B. Thereafter, the light output to the outside of the light guide member 203 is incident upon the prism sheet 204, is reflected by the second prism inclined surface 204b toward an upper side, and is subsequently refracted by the lens surface 204d in a substantially perpendicular direction so as to be incident into the liquid crystal display element, as shown by the arrows with the solid lines in FIG. 12A.

As described above, in the backlight unit 200 of the second conventional example, each of the plurality of the lens surfaces 204d provided on the prism sheet 204 gathers light, thereby enabling an increase in the directivity of the output light toward the liquid crystal display element.

However, the conventional backlight units as described above cannot increase the directivity of the output light, and may hardly increase brightness of the liquid crystal display device.

More specifically, in the backlight unit 100 of the first conventional example, it is necessary to increase the inclination angle of the inclined surface 103b shown as K1 in FIG. 11B so as to allow the light from the light source 102 that is incident into the light guide member 103 to travel upward along a normal line direction of the output surface 103a and to output the light from the output surface 103a efficiently. When the inclination angle K1 is increased as described above, an angle range of the light output from the output surface 103a to the outside (an angle difference between the arrow with the solid line and the arrow with the dotted line shown in FIG. 11B) is also increased. That is, an angle range of the incident angle of the light that is incident from the light guide member 103 upon the prism sheet 104 is also increased, an amount of the light that is output from the second prism inclined surface 104b toward the liquid crystal display element side at an angle inclined with respect to the normal line direction is increased, thereby decreasing the directivity of the output light from the prism sheet 104 (the backlight unit 100). As a result, an amount of the light that is incident into the liquid crystal display element in the perpendicular direction is decreased, and a half value of a brightness angle of the output light toward the liquid crystal display element is increased, thereby degrading the brightness (from a front view) of the liquid crystal display device.

Whereas, in the case of decreasing the inclination angle K1 of the inclined surface 103b in order to increase the directivity in the prism sheet 104, the light amount of the planar light that is output from the output surface 103a is decreased, that is, a plane output efficiency of the light on the output surface 103a is decreased. As a result, the efficiency of utilizing the light from the light source 102 is degraded, which consequently leads to the degradation of the brightness of the liquid crystal display device.

Moreover, in the backlight unit 200 of the second conventional example, the lens surface 204d, and the prism that is constituted of the first prism inclined surface 204a and the second prism inclined surface 204b are structured so as to have the same dimensions in the above-described transmitting direction S2. Thus, the second prism inclined surface 204b that mainly allows the light to travel from the prism side to the lens surface 204d is made smaller than the lens surface 204d, so that it is difficult to improve the light gathering efficiency on the lens surface 204d. Accordingly, it is also difficult to increase the directivity of the output light from the prism sheet 204 (backlight unit 200), so that it is not easy to increase the brightness of the liquid crystal display device. In particular, in a part near from the light source 202 of the prism sheet 204b, the light is likely to be incident upon the second prism inclined surface 204 at a large angle range similarly to the case of the backlight unit 100 of the first conventional example, and the lens surface 204d cannot gather the light in the normal line direction of the output surface 203a, so that the directivity of the output light from the backlight unit 200 may be decreased significantly.

In particular, in the case of applying the conventional backlight unit described above to the liquid crystal display device of the semi-transmission type, it is sometimes significantly difficult to increase the brightness of the liquid crystal display device. In detail, in the liquid crystal display device of the semi-transmission type, a plurality of reflecting electrodes are generally provided at a predetermined interval in a transmitting direction of light in a light guide member on an incident surface side of a liquid crystal display element. And, when utilizing the output light from the backlight unit, the liquid crystal display device of the semi-transmission type is necessary to allow the output light to pass through a transmission opening that is formed between the reflecting electrodes that are adjacent to each other in the transmitting direction, similarly to the liquid crystal display device of the transmission type. Thus, the liquid crystal display device of the semi-transmission type is required to allow the output light with high directivity to be incident from the backlight unit into the liquid crystal display element. However, in the above-described conventional backlight unit, the directivity of the output light is low, and an amount of the light passing through the transmission opening cannot be increased, so that it is very difficult to increase the brightness of the liquid crystal display device of the semi-transmission type.

SUMMARY OF THE INVENTION

In order to overcome the problems described above, preferred embodiments of the present invention provide a backlight unit that can increase directivity of output light and can increase brightness easily, and a liquid crystal display device including such a novel backlight unit.

A backlight unit according to a preferred embodiment of the present invention includes: a light source; a light guide member which has an input surface from which light from the light source is input and an output surface that outputs the light input from the input surface, leads the light that is input from the input surface toward a predetermined transmitting direction, and outputs the light from the output surface; an optical path changing portion which has a plurality of inclined surfaces that are inclined at a predetermined inclination angle with respect to the output surface, and changes an optical path of the light according to each of the plurality of the inclined surfaces such that the light output from the output surface travels substantially along a normal line direction of the output surface; and a light gathering portion having a plurality of light gathering surfaces each of which is disposed for each of the plurality of the inclined surfaces, and gathers light from the corresponding inclined surface toward the normal line direction of the output surface, wherein each of central positions of the plurality of the light gathering surfaces in the transmitting direction is matched substantially with a central position of its corresponding inclined surface in the transmitting direction.

In the backlight unit having the unique structure as described above, each of the plurality of the inclined surfaces that are provided in the optical path changing portion changes the optical path of the light from the light source that is output from the output surface of the light guide member such that the light travels substantially along the normal line direction of the output surface. Moreover, in the light gathering portion, a plurality of the light gathering surfaces are provided according to the plurality of the inclined surfaces, respectively, and each of the light gathering surfaces gathers the light from its corresponding inclined surface toward the above-described normal line direction. Further, since each of the central positions of the plurality of the light gathering surfaces in the transmitting direction of the light guide member is matched substantially with the central position of its corresponding inclined surface in the transmitting direction, each of the light gathering surfaces can output and allow the light to travel together in the normal line direction reliably, unlike the second conventional example described above. As a result, the directivity of the output light can be increased, thereby enabling to increase the brightness easily.

Also, in the above-described backlight unit, the light source may be structured by using a point light source, and the plurality of the inclined surfaces included in the optical path changing portion and the plurality of the light gathering surfaces included in the light gathering portion may be arranged along arcs having centers that are positioned at the point light source.

In this case, since the plurality of the inclined surfaces and the plurality of the light gathering surfaces are arranged along the arcs whose centers are positioned at the point light source, a size of the backlight unit can be decreased and the efficiency of utilizing the light from the light source can be improved.

Moreover, in the backlight unit, the optical path changing portion is preferably constituted of a prism sheet that is provided with a plurality of prisms having respective surfaces are used for the inclined surface.

In this case, the optical path changing portion provided with the plurality of the inclined surfaces that are formed integrally can be obtained easily, and an operation for incorporating them into the backlight unit can be simplified.

Also, in the backlight unit, each of the plurality of the light gathering surfaces may be constituted of a lens surface having a semicircular cross section that protrudes toward an outside.

In this case, compared with the case of structuring the light gathering surface by using a prism surface of a light gathering prism or the like, the structure of the light gathering portion can be simplified. Further, because of using the lens surface having the semicircular cross section, degradation of an efficiency of utilizing the light from the light source can be prevented, and the directivity of the output light can be increased easily.

Moreover, in the backlight unit, the optical path changing portion and the light gathering portion are preferably formed integrally.

In this case, the optical path changing portion and the light gathering portion can be incorporated into the backlight unit at the same time, the operation for assembling the backlight unit can be simplified easily. Moreover, since the optical path changing portion and the light gathering portion are formed integrally, an operation for coinciding the central position of the inclined surface with the central position of the light gathering surface can be omitted, the integrated optical path changing portion and light gathering portion can be attached in the backlight unit easily, without adjusting the positions of the inclined surface and the light gathering surface.

Moreover, the liquid crystal display device according to a preferred embodiment of the present invention is a liquid crystal display device including a liquid crystal display element, wherein the light from any one of the backlight units described above is input into the liquid crystal display element.

In the liquid crystal display device having the unique structure as described above, since the light with the increased directivity from the backlight unit is incident into the liquid crystal display element, the brightness of the liquid crystal display device can be increased easily.

Moreover, in the liquid crystal display device, a polarizing plate is preferably disposed between the light guide member and the liquid crystal display element such that a transmission axis is matched substantially with the transmitting direction of the light guide member.

In this case, it is possible to suppress the occurrence of optical absorption (loss) in the polarizing plate to a minimum, so that the liquid crystal display device with the high brightness can be structured easily.

Thus, preferred embodiments of the present invention provide a backlight unit that can increase directivity of output light and can increase brightness easily, and a liquid crystal display device including such a backlight unit.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 4A is a plan view, FIG. 4B is a cross-sectional view taken along a line IVb-IVb of FIG. 4A, and FIG. 4C is a cross-sectional view taken along a line IVc-IVc of FIG. 4B.

FIG. 11A is a side view, FIG. 11B is an enlarged view showing a portion of a light guide member of the backlight unit, and FIG. 11C is an enlarged view showing a portion of a prism sheet of the backlight unit.

FIG. 12A is a side view, FIG. 12B is an enlarged view showing a portion of a light guide member of the backlight unit, and FIG. 12C is an enlarged view showing a portion of a prism sheet of the backlight unit.

DETAILED DESCRIPTION OF PREFERRED EMBODIMENTS

Preferred embodiments of the backlight unit and the liquid crystal display device of the present invention will be described below with reference to the drawings. It should be noted that, in the following description, a case of applying the present invention to a liquid crystal display device of a semi-transmission type will be exemplified for the explanation.

First Preferred Embodiment

Figure 1:
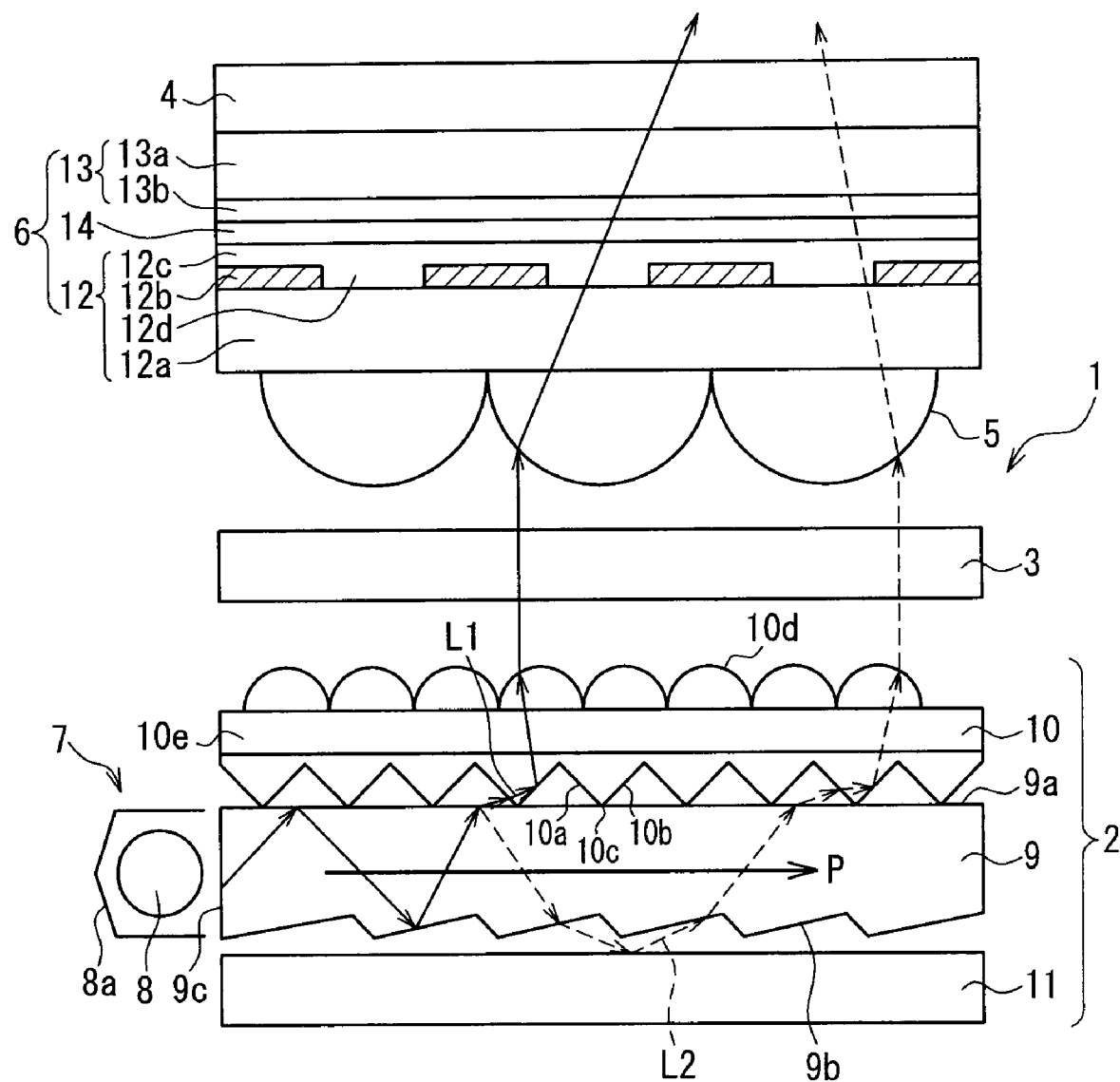
FIG. 1 is a view for explaining a structure of main portions of a backlight unit and a liquid crystal display device according to a first preferred embodiment of the present invention.

FIG. 1 is a view for explaining a structure of main portions of a backlight unit and a liquid crystal display device according to a first preferred embodiment of the present invention. In the figure, the liquid crystal display device 1 of the present preferred embodiment is provided with a backlight unit 2 according to a preferred embodiment of the present invention, a pair of polarizing plates 3 and 4, a microlens array 5 and a liquid crystal display element (liquid crystal panel) 6, and is structured such that output light from the backlight unit 2 is incident into the liquid crystal display element 6 as illumination light. Whereas, the polarizing plate 3 is disposed between the backlight unit 2 and the microlens array 5 that is provided on an upper side of the backlight unit 2 and on a lower side of the liquid crystal display element 6. Moreover, the other polarizing plate 4 is provided on an upper side (display surface side) of the liquid crystal display element 6.

The backlight unit 2 is provided with a planar light source device 7 that emits light in a flat shape (hereinafter, called as "planar light"), and a prism sheet 10 having lenses and a reflecting plate 11 that are respectively provided on an upper side and a lower side with respect to the planar light source device 7 in the figure, so that the planar light is allowed to be incident into the liquid crystal display element 6 via the prism sheet 10 and the polarizing plate 3. Moreover, in the polarizing plate 3, a (polarizing) transmission axis is arranged so as to be matched with a transmitting direction P described below, so that brightness of a display surface of the liquid crystal display element 6 can be increased more easily (detail will be described below).

The planar light source device 7 is provided with a light source 8 that emits and outputs light, a reflecting member 8a that is arranged so as to surround the light source 8, and a light guide member 9 that allows the light output from the light source 8 to be input and leads the input light to a predetermined transmitting direction (a horizontal direction of FIG. 1 shown as the arrow P therein). The light source 8 utilizes a cold cathode ray tube that is disposed, for example, in a direction perpendicular to the sheet of FIG. 1, which is constituted of a linear light source. A reflecting member 8a reflects the light output from the light source 8 toward the light guide member 9, thereby allowing the light from the light source 8 to be incident into the light guide member 9 efficiently.

The light guide member 9 is provided with a parallel output surface 9a that outputs the planar light toward the prism sheet 10 side, an inclined surface 9b that is arranged to face the reflecting plate 11 and is provided with a plurality of inclined portions which are inclined with respect to the output surface 9a, and an input surface 9c that is arranged to face the light source 8 and allows the light from the light source 8 to be input. In the output surface 9a, when the light from the light source 8 that is input from the input surface 9c is incident upon an interface between the output surface 9a and air at an incident angle that is a predetermined total reflection angle or larger, which is shown as R in FIG. 2, the light is totally reflected toward an inner side of the light guide member 9 and travels in a transmitting direction P, as shown by the arrows with the solid lines in FIG. 2. Whereas, as shown by the arrows with the dotted lines in FIG. 2, when the light is incident upon the interface at the incident angle that is smaller than the total reflection angle R, a portion of the light is reflected toward the inner side of the light guide member 9, and the remaining light is output from the output surface 9a toward the outer side.

Figure 3:
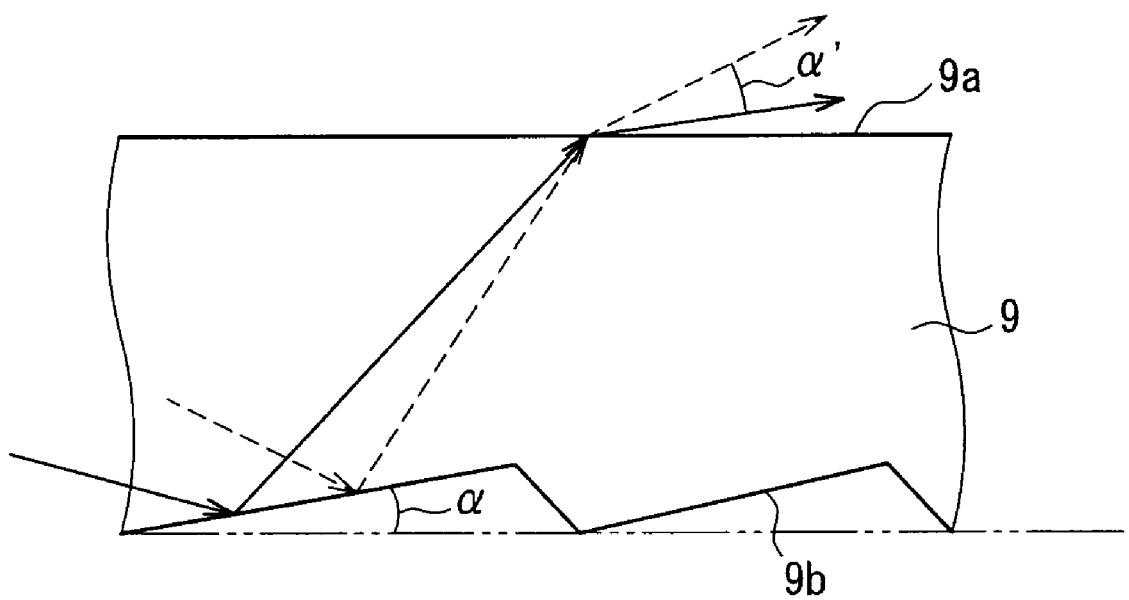
FIG. 3 is an enlarged view showing a portion of the light guide member.

As shown in FIG. 3, the inclined surface 9b is provided with a plurality of the inclined portions having an inclination angle with respect to the output surface 9a that is set to be $\alpha$ in the transmitting direction P. This inclination angle $\alpha$ is preferably set to be larger than 0° and smaller than 90°. More specifically, the inclination angle $\alpha$ of the inclined surface 9b is set to be, for example, about 12°, in order to improve an output efficiency of the planar light from the output surface 9a of the light guide member 9. Moreover, by setting the inclination angle $\alpha$ to be about 12° as described above, an angle of the output light that is output from the output surface 9a shown as $\alpha'$ in FIG. 3 has a range around 12°. Then, in this light guide member 9, the light from the light source 8 that is input into the inside thereof from the input surface 9c is repeatedly reflected by the output surface 9a and the inclined surface 9b or the reflecting plate 11 so as to be lead toward the transmitting direction P, and is output from the output surface 9a toward the prism sheet 10 appropriately.

The prism sheet 10 having lenses includes an optical path changing portion and a light gathering portion that are formed integrally, where the optical path changing portion changes an optical path of the light from the light source 8 output from the output surface 9a such that the light travels substantially along a normal line direction of the output surface 9a, and the light gathering portion gathers the light from the light source 8 whose optical path is changed by this optical path changing portion toward the normal line direction.

Figure 4A:
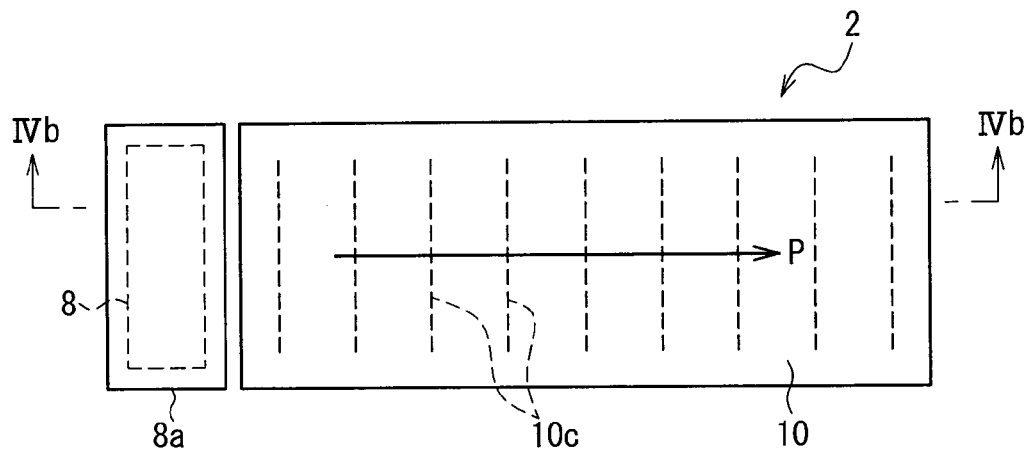
FIGS. 4A-4C is a view for explaining the structure of the main portions of the backlight unit shown in FIG. 1, more specifically.
Figure 4B:
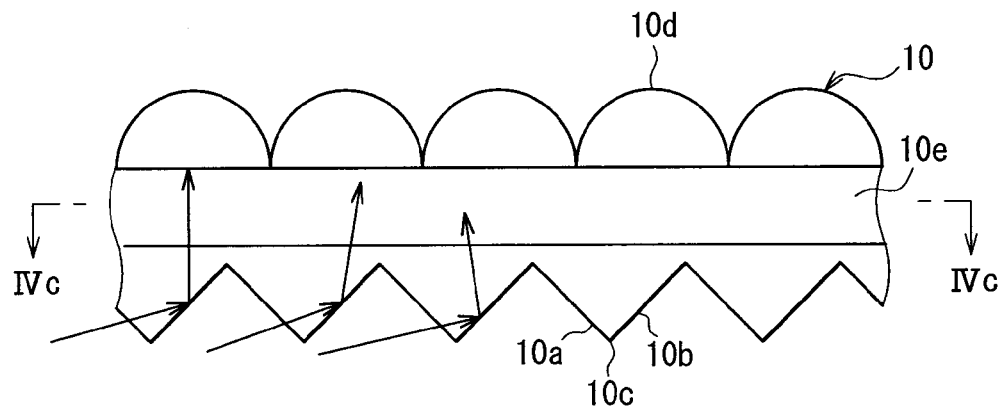
Figure 4C:
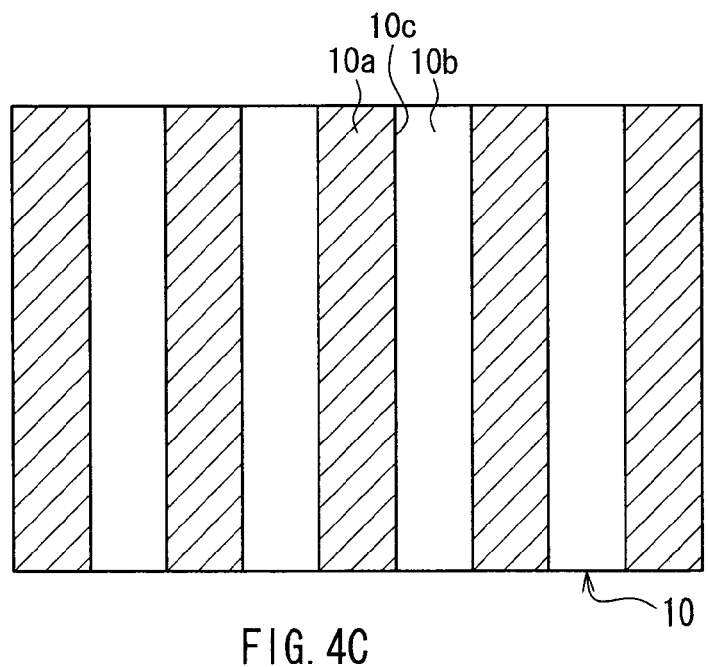

More specifically, as shown also in FIGS. 4A-4C, the prism sheet 10 preferably includes a prism surface as the optical path changing portion, which is disposed facing the output surface 9a of the light guide member 9 and is constituted of a plurality of (for example, nine) prisms in a sawtooth configuration; and a plurality of (for example, eight) lenses as the light gathering portion, which are provided on an opposite side of the light guide member 9 of this prism surface and are disposed facing the liquid crystal display element 6. Each of the prisms of the prism surface preferably has, for example, an isosceles triangular cross section, and is provided with a first prism inclined surface 10a and a second prism inclined surface 10b that are disposed alternately.

Figure 5:
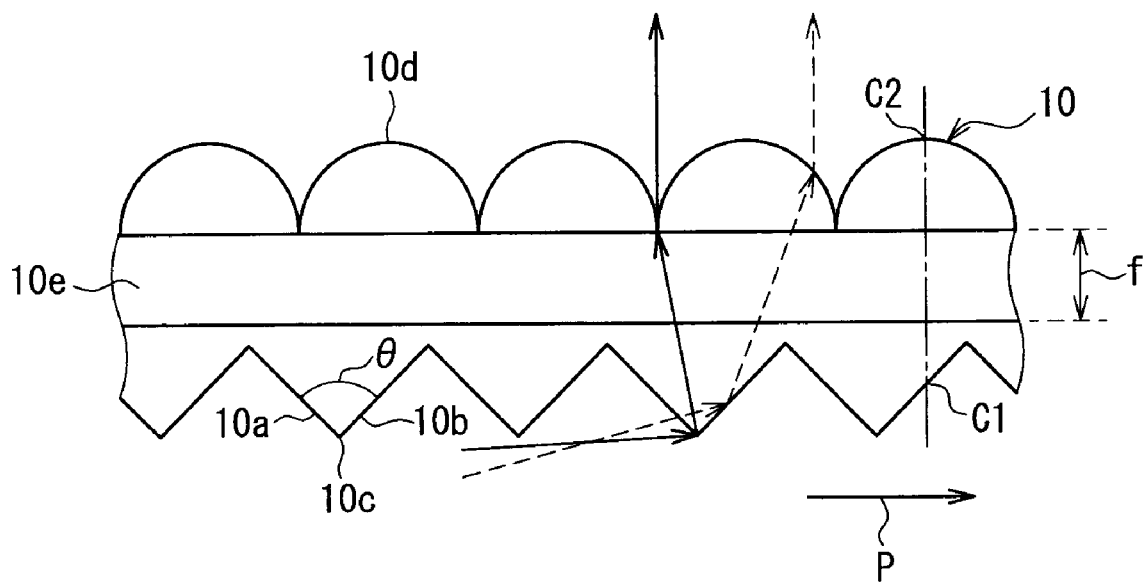
FIG. 5 is an enlarged view showing a portion of a prism sheet shown in FIG. 1.

Moreover, on the prism sheet 10, a vertical angle between the first and second prism inclined surfaces 10a and 10b is set to be $\theta$ (for example, about 62°) (see also FIG. 5). Further, on the prism sheet 10, among the first and second prism inclined surfaces 10a and 10b, the second prism inclined surface 10b constitutes each of the plurality of the inclined surfaces that are formed in the optical path changing portion, and can change the optical path substantially by reflecting the light from the light source 8 as described below. Moreover, an inclination angle of this second prism inclined surface 10b with respect to the output surface 9a of the light guide member 9 is set to be, for example, about 59° (=(180°−62°)/2), so that the prism inclined surface 10b is structured so as to function as the inclined surface that contributes to change the optical path of the light appropriately and sufficiently.

Moreover, in the prism sheet 10, a ridge line 10c is disposed on a boundary between the first and second prism inclined surfaces 10a and 10b. This ridge line 10c is structured so as to cross the transmitting direction P, preferably perpendicularly, as shown by the dotted lines in FIG. 4A, and a dimension of an interval between the two adjacent ridge lines 10c (that is, a pitch dimension of the prisms) is preferably set to be about 30 μm, for example.

Moreover, on a surface of the prism sheet 10 on the liquid crystal display element 6 side facing the prism surface, a lens surface 10d having a semicircular or substantially semicircular cross section that protrudes to the outside is formed according to the second prism inclined surface 10b. That is, the prism sheet 10 is integrally made of a synthetic resin which is entirely transparent (for example, acrylic resin, polycarbonate resin, epoxy resin or the like), and has a base portion 10e having a rectangular or substantially rectangular cross section. Moreover, on the prism sheet 10, the prism having an isosceles triangular cross section that is constituted of the first and second prism inclined surfaces 10a and 10b is provided on a lower side of the base portion 10e. Whereas, on an upper side of the base portion 10e, the lens surface 10d as the light gathering surface included in the light gathering portion is provided at a pitch (for example, about 30 μm) that is equal to an arrangement pitch of the ridge lines 10c of the prism.

Moreover, in the prism sheet 10, a central position C2 of each of the lens surfaces 10d in the transmitting direction P is matched with a central position C1 of its corresponding second prism inclined surface 10b in the transmitting direction P, as shown in FIG. 5. That is, in the prism sheet 10, the central positions C2 and C1 of the lens surface 10d and the second prism inclined surface 10b are matched in the normal line direction of the light guide member 9, so that the light gathering efficiency of the lens surfaces 10d is enhanced. Thereby, in the prism sheet 10, each of the lens surfaces 10d gathers the light reflected by its corresponding second prism inclined surface 10b to be parallel light that is parallel with the normal line direction reliably, and can output the parallel light toward the liquid crystal display element 6 side via the polarizing plate 3, as shown by the arrows with the solid lines and the dotted lines in FIG. 5. Moreover, in the polarizing plate 3, since the transmission axis thereof is arranged so as to be matched with the transmitting direction P of the light guide member 9, the parallel light form the prism sheet 10 is output toward the liquid crystal display element 6 side without being mostly absorbed by the polarizing plate 3. Thereby, it is possible to suppress the occurrence of optical absorption (loss) by the polarizing plate 3 to a minimum, so that the brightness of the display surface of the liquid crystal display element 6 can be increased more easily.

Incidentally, the above description explained the case where the number of the prisms disposed is larger by one than the number of the lenses disposed in the prism sheet 10, as shown in FIG. 1, but the disposal of the prism on a right end in FIG. 1 may be omitted. That is, light, which is reflected by the second prism inclined surface 10b of this prism on the right end toward the liquid crystal display element 6 side, is not incident into an effective display region of the liquid crystal display element 6, so that the light does not contribute to the display of the liquid crystal display element 6.

Moreover, a radius of a curvature of each of the lens surfaces 10d is set to be, for example, about 25 μm, and a thickness dimension f of the base portion 10e is determined to be, for example, about 30 μm. Moreover, this thickness dimension f of the base portion 10e is set appropriately within a range, for example, from about 20 μm to about 40 μm, according to the inclination angle α of the inclined surface 9b of the light guide member 9, the vertical angle θ of the above-described prism (the inclination angle of the second prism inclined surface 10b with respect to the output surface 9a), the radius of the curvature of the lens surface 10d and the like. Moreover, by providing the base portion 10e having the thickness dimension f in such a range, the lens surface 10d can output the light that is reflected by the second prism inclined surface 10b at various angles so as to allow the light to travel together with the above-described parallel light easily.

By referring to FIG. 1 again, on the surface side of the reflecting plate 11 facing the inclined surface 9b of the light guide member 9, a reflecting film that is made of a dielectric substance or a metal is arranged so as to reflect the light, which is output from the inclined surface 9b to the outside of the light guide member 9, toward the light guide member 9 side. Thereby, the light that is output once to the outside of the light guide member 9 can be incident into the inside of the light guide member 9 again, thereby improving the efficiency of utilizing the light from the light source 8.

The liquid crystal display element 6 is provided with an active matrix substrate 12, a facing substrate 13 that is disposed facing the active matrix substrate 12, and a liquid crystal layer 14 that is provided between the active matrix substrate 12 and the facing substrate 13. This liquid crystal layer 14 includes a liquid crystal molecule that has, for example, positive dielectric anisotropy, and is sealed between the active matrix substrate 12 and the facing substrate 13.

Moreover, a screen size of the liquid crystal display element 6 is, for example, about 2.4 inches in diagonal diameter (length: about 49.0 mm, width: about 36.7 mm), and pixels (R, G, B) that constitute a smallest display unit of the liquid crystal display element 6 are arranged in stripe with, for example, a horizontal pixel number 240×a vertical pixel number 320. Moreover, pitches of the above-described pixels are set to be, for example, about 0.153 mm in the vertical direction, and about 0.051 mm in the horizontal direction, and the liquid crystal display element 6 is structured such that it can drive the liquid crystal layer 14 by each pixel unit.

The active matrix substrate 12 preferably includes a transparent substrate 12a that is made of, for example, a glass material, a plurality of reflecting electrodes 12b that are disposed at a predetermined interval on a surface of the transparent substrate 12a on the liquid crystal layer 14 side (illustrated as a hatched portion in FIG. 1); and a transparent electrode 12c that is provided on the transparent substrate 12a on the liquid crystal layer 14 side. Moreover, in the active matrix substrate 12, a transmission opening 12d is formed in a portion where the reflecting electrodes 12b are not provided, that is, between the two adjacent reflecting electrodes 12b.

To the transparent electrode 12c, a driving circuit (not illustrated) for applying a voltage in order to change a state of an orientation of the liquid crystal molecule is connected, so that the driving circuit drives the transparent electrode 12c so as to control the orientation of the liquid crystal molecule, thereby controlling an intensity of the light passing through the liquid crystal layer 14.

Moreover, in the active matrix substrate 12, a plurality of thin film transistors, which are not illustrated, are arranged in matrix, and each of the thin film transistors controls electric charges of the reflecting electrode 12b and the transparent electrode 12c. Further, on a surface of the transparent substrate 12a on the backlight unit 2 side, the microlens array 5 is provided integrally.

Figure 6:
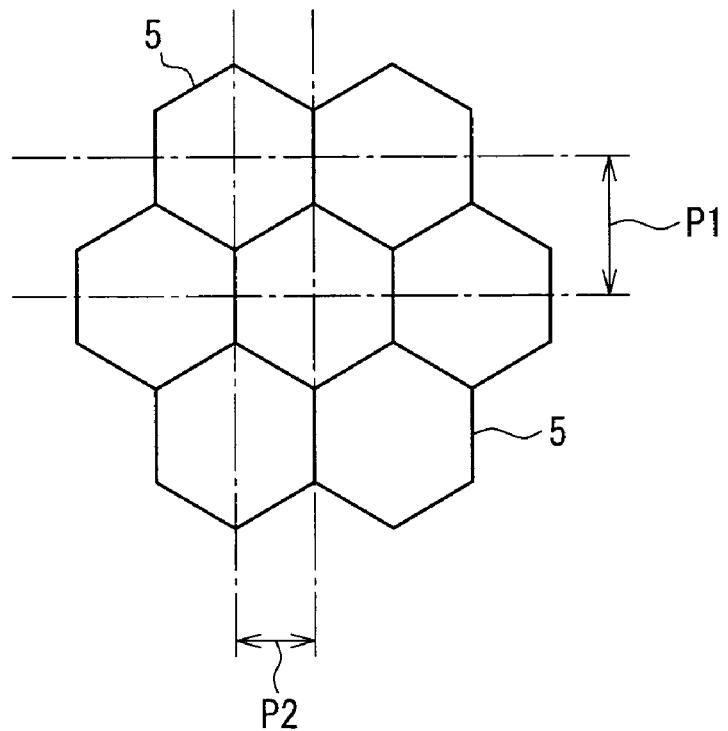
FIG. 6 is a view for explaining an arrangement of a microlens array shown in FIG. 1.

The microlens array 5 includes a plurality of spherical lenses with a curvature of, for example, about 80 μm, and the spherical lens is preferably formed by applying a transparent acrylic or epoxy resin with a refractive index of, for example, about 1.51 onto the transparent substrate 12a and patterning the resin. More specifically, in the microlens array 5, the spherical lenses are arranged substantially in a delta arrangement as illustrated in FIG. 6. Moreover, these spherical lenses are provided according to the transmission opening 12d of the active matrix substrate 12. More specifically, a shape of the transmission opening 12d that is determined by the reflecting electrode 12b and the transparent electrode 12c is a circle with a diameter of, for example, about 0.042 mm, and the transmission opening 12d and the spherical lens of the microlens array 5 are disposed so that central positions thereof are matched with each other.

Moreover, in the microlens array 5, the pitch of the spherical lenses shown as P1 in FIG. 6 in a direction parallel with the above-described transmitting direction P in the light guide member 9 is preferably set to be about 76.5 μm, for example. Further, the pitch of the spherical lenses shown as P2 in FIG. 6 in a direction perpendicular to the transmitting direction P is set to be about 51 μm, for example.

Moreover, in the microlens array 5, a thickness of the active matrix substrate 12 and a height of a protrusion of the spherical lens are adjusted such that a distance from the transmission opening 12d (the surface of the transparent substrate 12a on the liquid crystal layer 14 side) to a vertex of the spherical lens may be a predetermined dimension (for example, about 220 μm).

By referring to FIG. 1 again, the facing substrate 13 is provided with a transparent substrate 13a and a transparent electrode 13b that is provided on a surface of the transparent substrate 13a on the liquid crystal layer 14 side. The transparent substrate 13a is preferably made of, for example, a glass material that is the same as the material of the above-described transparent substrate 12a, and the polarizing plate 4 is provided on the other surface of the facing substrate 13 on an opposite side of the liquid crystal layer 14.

Operations of the liquid crystal display device 1 structured as described above will be explained specifically below, with reference to FIGS. 1 to 5. It should be noted that the following description will mainly provide a case where the liquid crystal display device 1 operates similarly to that of the transmission type.

Figure 2:
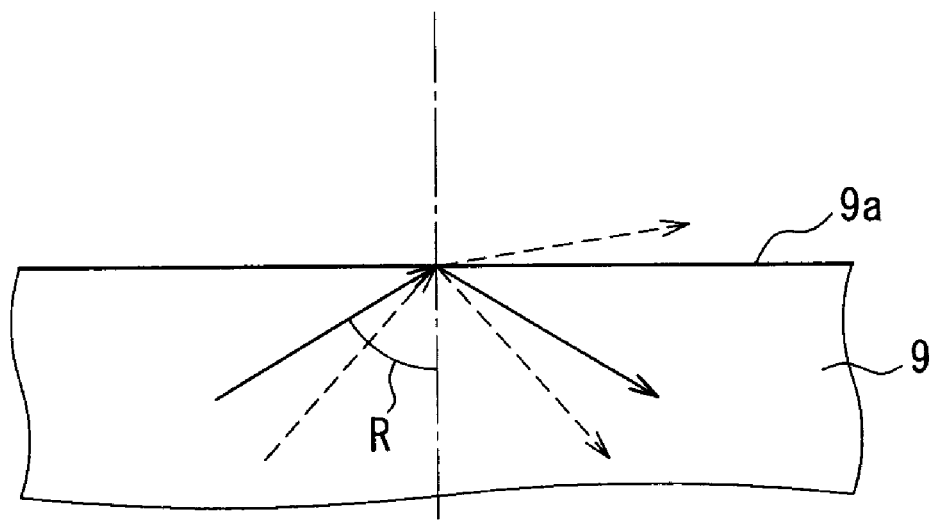
FIG. 2 is a view for explaining reflection and refraction of light by an output surface of a light guide member shown in FIG. 1.

Firstly, in the backlight unit 2, when the light from the light source 8 is incident into the inside of the light guide member 9 through the input surface 9c, the incident light travels in the transmitting direction P toward an end surface that is formed in parallel with the input surface 9c. Then, as shown in FIG. 2, when the light that travels inside the light guide member 9 is incident upon the interface between the output surface 9a and the air at the incident angle smaller than the predetermined total reflection angle R, a portion of the light is refracted by the interface so as to be output to the outside of the light guide member 9, and a portion of the light is reflected by the interface toward the inner side of the light guide member 9. Whereas, when the light is incident upon the interface at the incident angle that is the total reflection angle R or larger, the light is totally reflected toward the inner side of the light guide member 9.

Moreover, as shown in FIG. 1, light L1 that is output from the output surface 9a to the outside has factors in the transmitting direction P and a direction from the light guide member 9 toward the prism sheet 10, and travels toward a right oblique upper direction in FIG. 1. Then, this light L1 is incident into the prism sheet 10, and is reflected by the second prism inclined surface 10b substantially in the normal line direction of the output surface 9a. Thereafter, the light L1 is refracted by the lens surface 10d so as to travel together in the normal line direction, thereby being output from the prism sheet 10 perpendicularly with respect to the liquid crystal display element 6.

Whereas, the light that is reflected by the interface between the output surface 9a and the air travels toward the inclined surface 9b, and reaches an interface between the inclined surface 9b and the air. Then, the light refracted by this interface is output from the inclined surface 9b to the outside of the light guide member 9. The light L2 that is output from this inclined surface 9b to the outside has factors in the transmitting direction P and a direction from the light guide member 9 toward the reflecting plate 11, and travels toward a right oblique lower direction in FIG. 1. Then, when this light L2 is regularly reflected by the reflecting plate 11, the light L2 is incident into the inside of the light guide member 9 again, and is output from the output surface 9a toward the prism sheet 10. Thereafter, similarly to the light L1, the light L2 is reflected by the second prism inclined surface 10b, and is refracted by the lens surface 10d so as to travel together in the normal line direction, thereby being output from the prism sheet 10 perpendicularly with respect to the liquid crystal display element 6.

Moreover, even if the light is totally reflected by the interface between the output surface 9a and the air at the incident angle larger than the total reflection angle R, when the light is reflected by the inclined surface 9b having the inclination angle α toward the inner side of the light guide member 9 after the total reflection, the incident angle of the light that is incident upon the interface again is smaller than the total reflection angle R. Thus, a portion of the light is output from the output surface 9a toward the liquid crystal display element 6 side, and the remaining portion of the light is reflected toward the inclined surface 9b side so as to be lead toward the transmitting direction P inside the light guide member 9. Thereby, the light guide member 9 can utilize the light from the light source 8 efficiently, and can make uniform the brightness of the planar light from the output surface 9b.

Incidentally, in the case of operating the liquid crystal display device 1 similarly to that of the reflection type, the external light that is incident from an upper side of the polarizing plate 4 is reflected by the reflecting electrode 12b so as to be utilized for the display on the liquid crystal display element 6, so that the operation for displaying information such as character images and the like can be performed without switching ON the backlight unit 2.

In the present preferred embodiment having the unique structure as described above, the prism sheet (the optical path changing portion and the light gathering portion) 10 is provided with a plurality of the second prism inclined surfaces (the inclined surfaces) 10b, and a plurality of the lens surfaces (the light gathering surfaces) 10d according to the second prism inclined surfaces 10b. Moreover, the central position C2 of each of the lens surfaces 10d in the transmitting direction P of the light guide member 9 is matched with the central position C1 of its corresponding second prism inclined surface 10b in the transmitting direction P. Thereby, unlike the above-described second conventional example, in the backlight unit 2, even when the light is incident upon the second prism inclined surface 10b at an angle in a wide range, each of the lens surfaces 10d can gather the light reliably in the normal line direction of the output surface 9a so as to make the light into parallel light, thereby outputting the light toward the liquid crystal display element 6 side. As a result, the directivity of the output light that is output from the backlight unit 2 can be increased.

Moreover, as described above, the backlight unit 2 of the present preferred embodiment can output the output light with the high directivity toward the liquid crystal display element 6, and thus can increase the brightness of the liquid crystal display device 1 of the semi-transmission type easily. Thus, it is possible to easily structure the liquid crystal display device 1 of the semi-transmission type that has an excellent efficiency of utilizing the light from the light source 8, and can suppress power consumption. Further, because of using the backlight unit 2 with the high directivity, the reflecting electrode 12b can be large, so that the efficiency of utilizing the external light in the case of operating the liquid crystal display device 1 similarly to that of the reflection type can be increased, thereby increasing the brightness.

Here, a verification test carried out by the present inventors will be described specifically.

Figure 7:
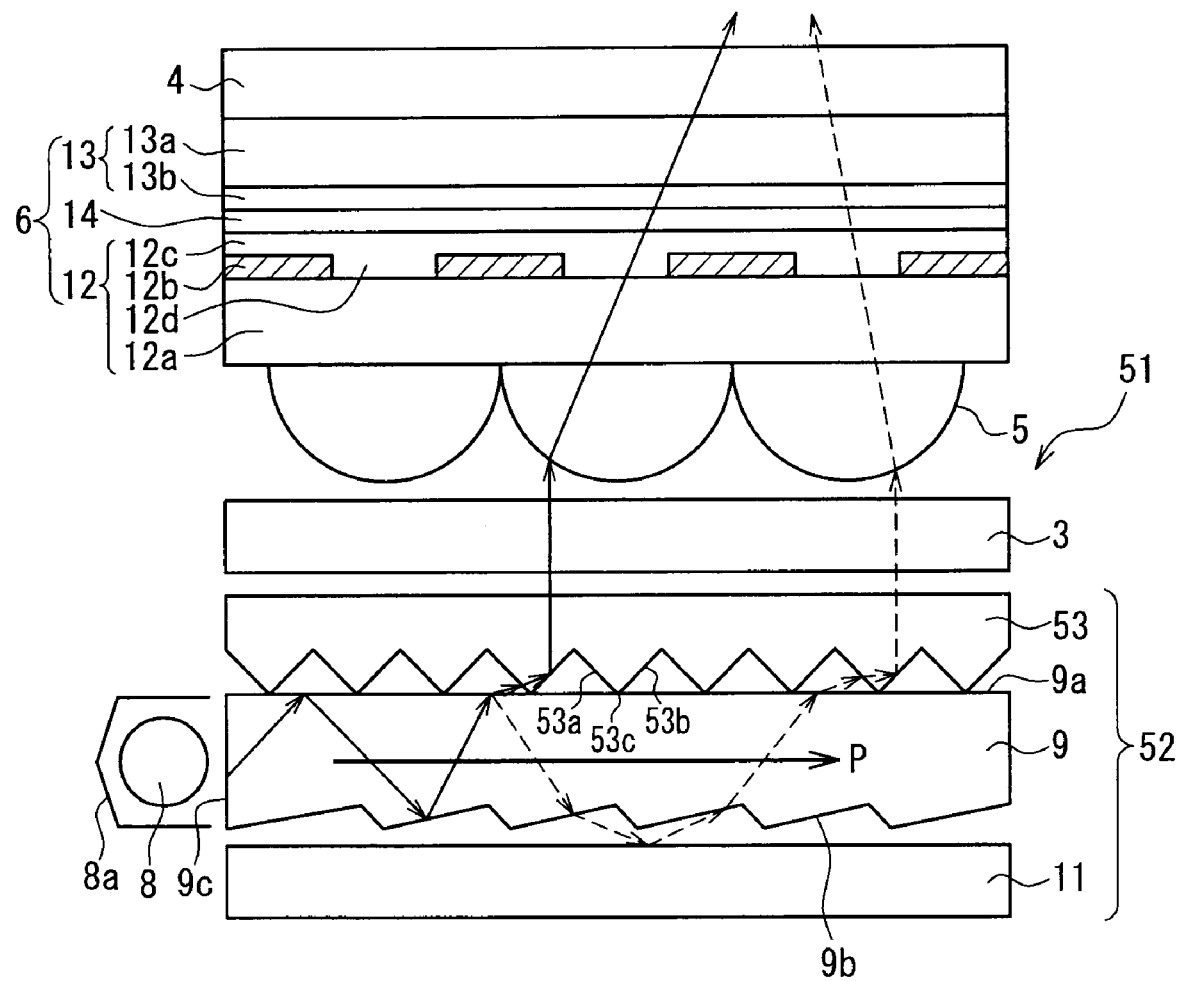
FIG. 7 is a view for explaining a structure of a comparative liquid crystal display device.

In this verification test, the liquid crystal display device 1 of the present preferred embodiment shown in FIG. 1 and a liquid crystal display device 51 (hereinafter, called as a comparative liquid crystal display device) provided with a corresponding conventional backlight unit 52 shown in FIG. 7 were prepared so as to carry out a comparative test as described below, thereby verifying that the directivity and the brightness of the output light of the liquid crystal display device 1 of the present preferred embodiment are increased. It should be noted that, in the comparative liquid crystal display device 51, a prism sheet 53 that was equivalent to the prism sheet 104 shown in FIGS. 10A and 10B was used instead of the prism sheet 10 provided with the lenses of the present preferred embodiment. That is, as the prism sheet 53, a prism sheet provided with a prism having a first prism inclined surface 53a, a second prism inclined surface 53b and a ridge line 53c that are disposed only on a surface side of the light guide member 9 facing the output surface 9a was used. Also, optical properties and brightness properties of the liquid crystal display device 1 of the present preferred embodiment and the comparative liquid crystal display device 51 were obtained when turning ON the same light source 8.

Figure 8:
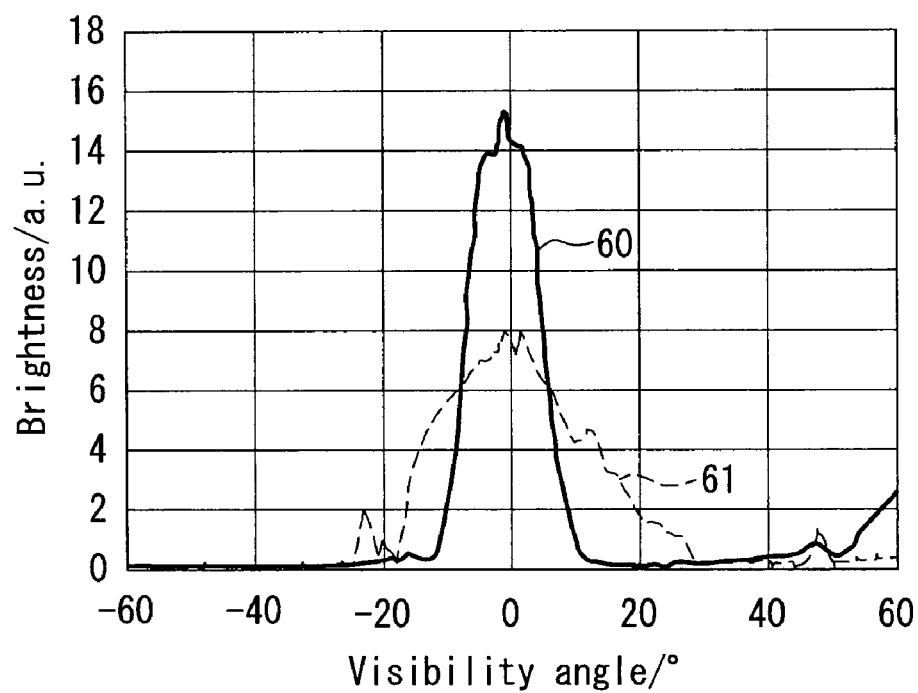
FIG. 8 is a graph showing an example of results of a comparative test.

That is, it was verified that, as shown as the solid line 60 in FIG. 8, the brightness (a.u.) of the output light that is output from the backlight unit 2 in the liquid crystal display device 1 of the present preferred embodiment had a transmission light flux at and around a visibility angle of 0° that was about twice or more the brightness of the comparative liquid crystal display device 51, which is shown as the dotted line 61 in the figure, thereby increasing the directivity.

Figure 9:
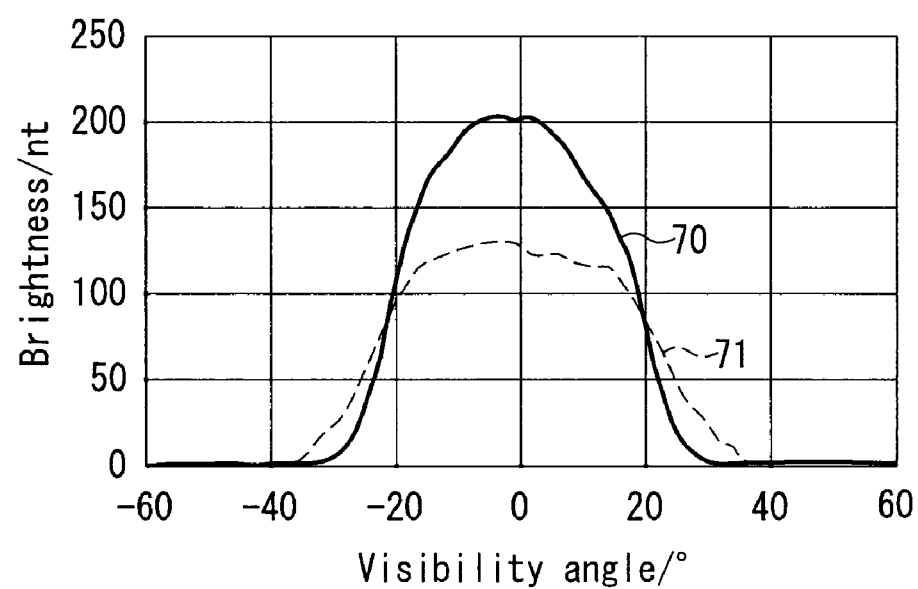
FIG. 9 is a graph showing another example of results of the comparative test.

Moreover, it was verified that the brightness (nt) on the display surface of the liquid crystal display device 1 of the present preferred embodiment, which is shown as the solid line 70 in FIG. 9, had the transmission light flux at and around the visibility angle of 0° which was about 1.5 times or more that of the comparative liquid crystal display device 51, which is shown as the dotted line 71 in the figure, thereby increasing the brightness.

Further, as shown in Table 1 below, it was verified that, in the liquid crystal display device 1 of the present preferred embodiment, the minimum value of the brightness and a variable value of the transmission light flux within a range of the visibility angle of about 0°±5° were increased by about 1.5 times and about 1.3 times the minimum value of a brightness and a variable value of the transmission light flux of the conventional liquid crystal display device, respectively.

TABLE 1

|  | Brightness (nt) | Transmission light flux (a.u) |
|---|---|---|
| Liquid crystal display device of present embodiment | 200 | 2.2 |
| Comparative liquid crystal display device | 130 | 1.7 |

As described above, it was verified that, in the liquid crystal display device of the present preferred embodiment, even when the light from the light source 8 was incident from the output surface 9a upon the second prism inclined surface 10b at an angle in a range shown by α' in FIG. 3, and reflected light with low directivity was reflected toward the lens surface 10d side, the lens surface 10d gathered the reflected light with the low directivity toward the normal line direction of the output surface 9a, thereby increasing the directivity of the output light from the backlight unit 2. Moreover, it was also verified that, according to this increase of the directivity of the output light of the backlight unit 2, the brightness of the liquid crystal display device 1 could be increased.

Second Preferred Embodiment

Figure 10A:
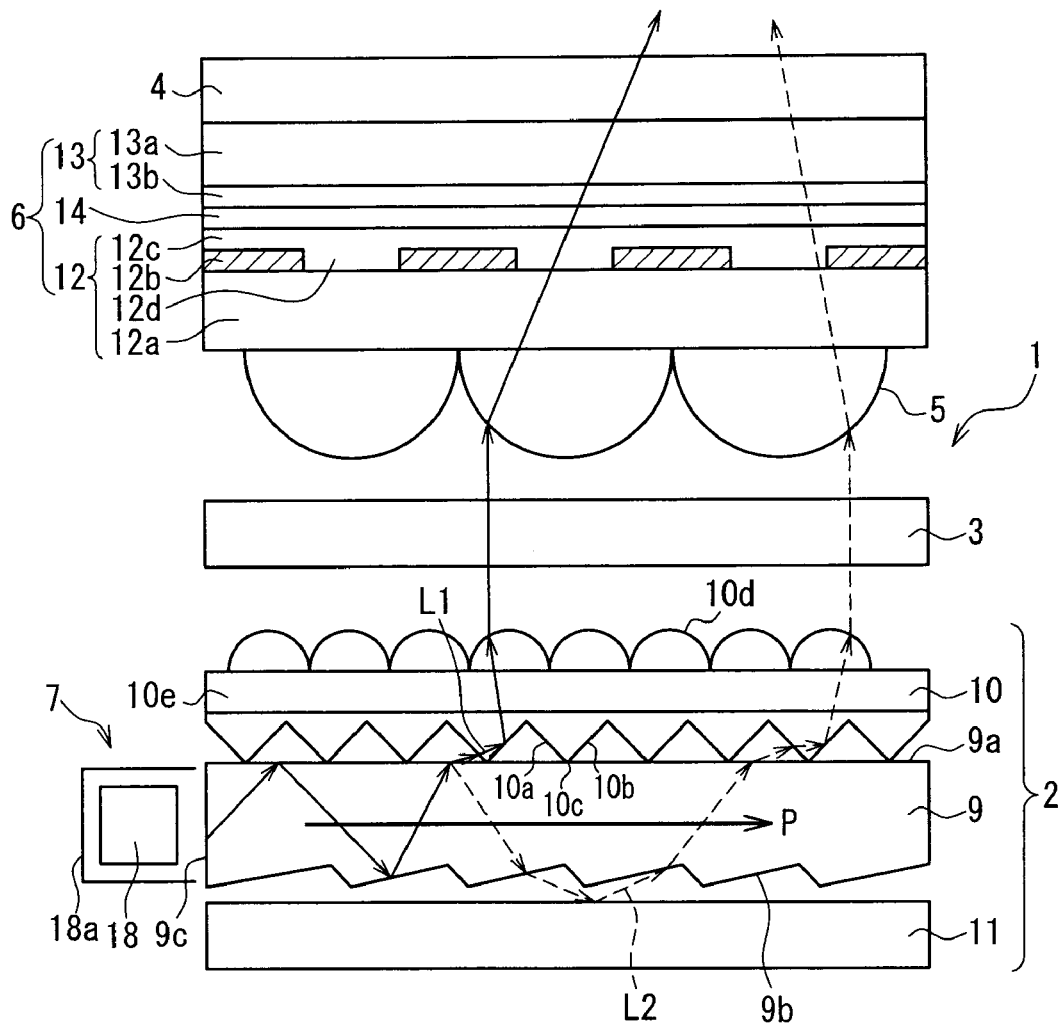
FIG. 10A is a view for explaining a structure of main portions of a backlight unit and a liquid crystal display device according to a second preferred embodiment of the present invention.
Figure 10B:
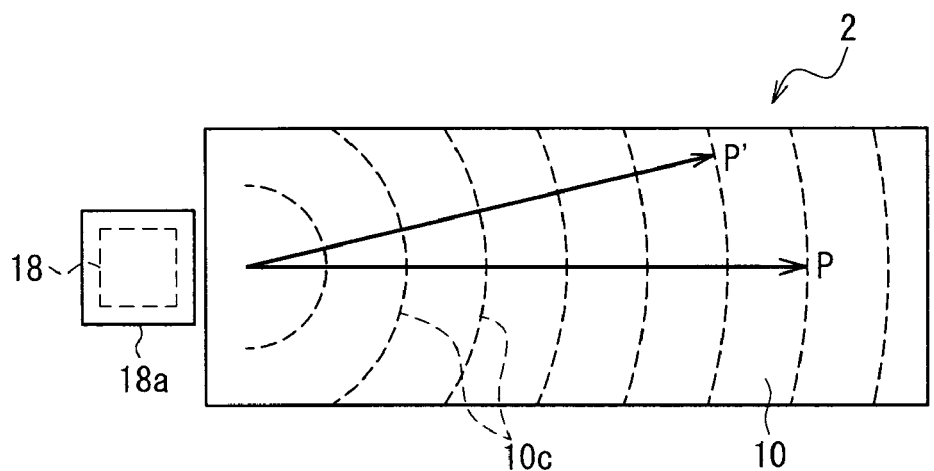
FIG. 10B is a plan view of the backlight unit shown in FIG. 10A.
Figure 11A:
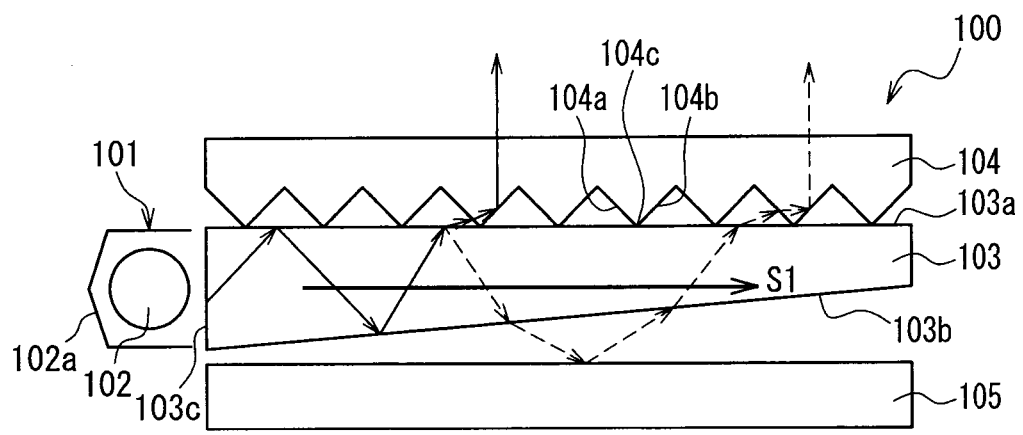
FIGS. 11A-11C are views for explaining a backlight unit of a first conventional example, more specifically.
Figure 11B:
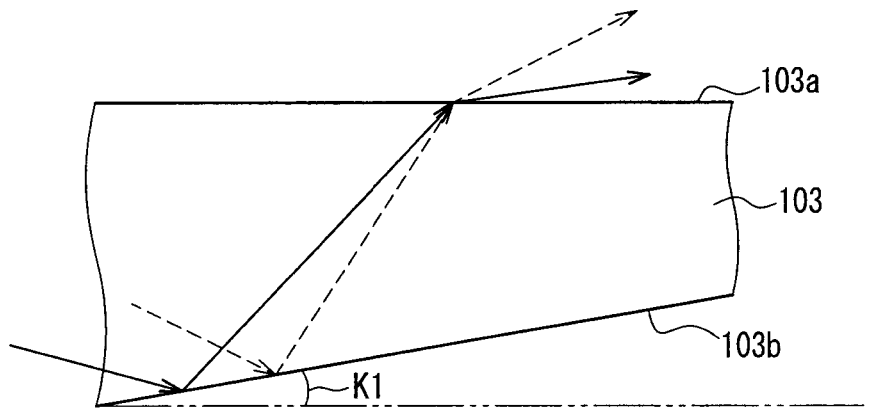
Figure 11C:
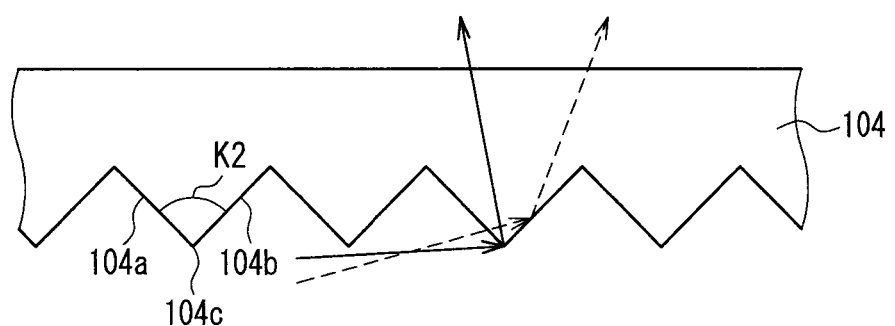
Figure 12A:
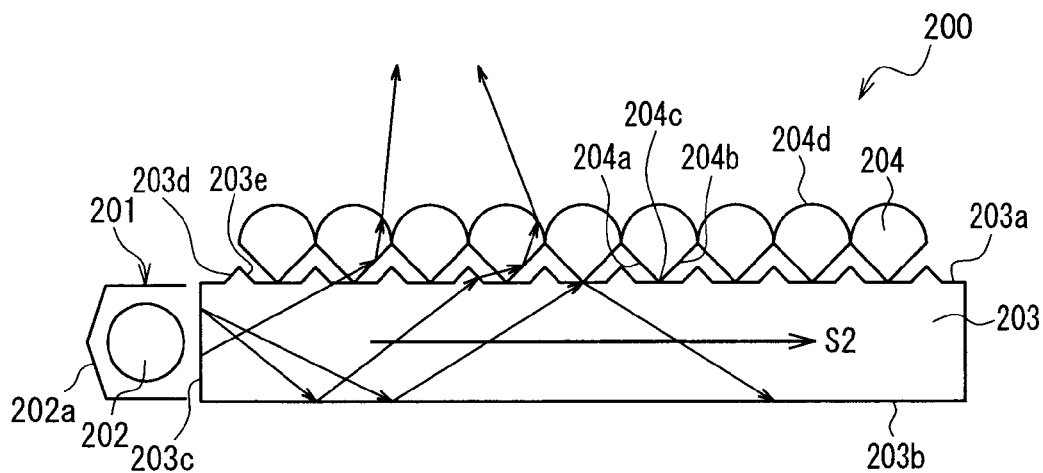
FIGS. 12A-12C are views for explaining a backlight unit of a second conventional example, more specifically.
Figure 12B:
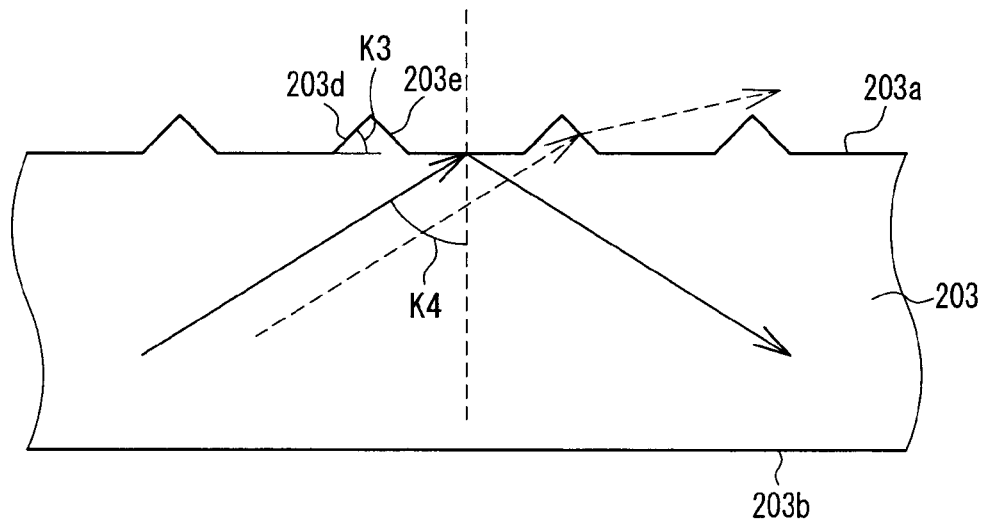
Figure 12C:
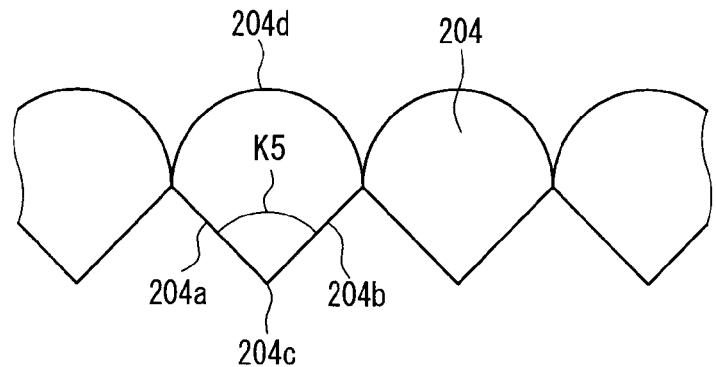

FIG. 10A is a view for explaining a structure of main portions of a backlight unit and a liquid crystal display device according to a second preferred embodiment of the present invention, and FIG. 10B is a plan view of the backlight unit shown in FIG. 10A. In the figures, a main distinctive point of the present preferred embodiment from the above-described first preferred embodiment lies in using of a light emitting diode instead of the cold cathode ray tube as the light source, and providing a plurality of the second prism inclined surfaces and a plurality of the lens surfaces along arcs whose centers are positioned at this light emitting diode. Incidentally, elements provided in common with the first preferred embodiment described above are given the same reference numerals, and the redundant description thereof will be omitted here.

That is, as shown in FIGS. 10A and 10B, in the present preferred embodiment, a light source 18 using a point light source, for example, a light emitting diode is disposed facing the light guide member 9, so that light from this light source 18 can be efficiently incident upon the input surface 9c of the light guide member 9 via a reflecting member 18a that is provided so as to surround the light source 18, and is transmitted radially.

Moreover, as shown in FIG. 10B, the light source 18 is disposed facing the central portion of the input surface 9c of the light guide member 9. Further, in the prism sheet 10, as shown by the dotted lines in FIG. 10B, a plurality of the ridge lines 10c are provided along arcs (concentrically) having centers are positioned at the light source 18, and each of the ridge lines 10c crosses the transmitting directions P and P', preferably perpendicularly. That is, in the prism sheet 10, the plurality of the first and second prism inclined surfaces 10a and 10b are also arranged along arcs whose centers are positioned at the light source 18, respectively. Further, on the polarizing plate 3 side of the prism sheet 10, similarly to the plurality of the first and second prism inclined surfaces 10a and 10b, the plurality of the lens surfaces 10d are arranged along arcs whose centers are positioned at the light source 18. And, for example, in the above-described transmitting direction P or P' that connects respective vertexes of the plurality of the lens surfaces 10d, the central position C1 of the second prism inclined surface 10b and the central position C2 of the lens surface 10d, which correspond to each other in the vertical direction in FIG. 5, are matched with each other in the normal line direction of the light guide member 9 as shown in FIG. 5. Thereby, in the prism sheet 10, a light gathering effect of the lens surface 10d is increased, similarly to that of first preferred embodiment.

Moreover, in the present preferred embodiment, the plurality of the inclined surfaces 9b of the light guide member 9 are arranged along arcs whose centers are positioned at the light source 18 according to the shape of the prism sheet 10, similarly to the prism sheet 10. Thereby, the light guide member 9 is structured such that the light from the light source 18 which is transmitted radially inside the light guide member 9 can be output toward the prism sheet 10 side more appropriately.

Moreover, in the present preferred embodiment, the output light (planar light) from the prism sheet 10 is incident into the liquid crystal display element 6 via the polarizing plate 3 whose transmission axis is arranged so as to be matched substantially with the transmitting direction P or P', whereby it is possible to suppress the occurrence of optical absorption (loss) by the polarizing plate 3 to a minimum similarly to the first preferred embodiment, so that the brightness of the display surface of the liquid crystal display element 6 can be increased more easily.

According to the above-described structure, the present preferred embodiment can achieve effects similar to those of the first preferred embodiment. Moreover, in the present preferred embodiment, the plurality of the second prism inclined surfaces (the inclined surfaces) 10b and the plurality of the lens surfaces (the light gathering surfaces) 10d are respectively arranged along the arcs whose centers are positioned at the (point) light source 18. Thereby, in the present preferred embodiment, the size of the backlight unit 2 can be decreased more easily than that in the case of using a linear light source such as a cold cathode ray tube. Further, it is possible to dispose an effective light emitting region of the light source 18 so as to face the light guide member 9 easily without increasing the dimension of the light guide member 9 more than necessary, unlike that of the above-described cold cathode ray tube in which non-light emitting regions such as electrode portions are formed at both end portions, thereby increasing the efficiency of utilizing the light from the light source more easily than that in the case of using the linear light source.

Incidentally, in the above description, an example of applying the backlight unit according to a preferred embodiment of the present invention to the liquid crystal display device of the semi-transmission type was provided, but the backlight unit of preferred embodiments of the present invention is not limited to this, and may be applied also to a liquid crystal display device of a transmission type in which a reflecting electrode is not provided in a liquid crystal display element and a liquid crystal display device of a semi-transmission type in which a microlens array is not provided.

Moreover, the above description explained an example where the central positions of the inclined surface and the light gathering surface are preferably matched with each other in the transmitting direction of the light from the light guide member, for example, as shown by C1 and C2 in FIG. 5, but the present invention is not limited to this, and each of the central positions of the plurality of the light gathering surfaces in the transmitting direction may be matched substantially with the central position of its corresponding inclined surface in the transmitting direction.

More specifically, in the verification test carried out by the present inventors, the inclination angle α and the vertical angle θ were respectively set to be, for example, about 59° and about 62° so as to measure the transmission light flux within a range of the visibility angle of about 0°±5°. Then, it was judged that, while displacing the central position C1 and the central position C2 in the transmitting direction gradually, the directivity of the output light is increased, when a measurement result of the transmission light flux within the above-described range was about 1.2 times that of the comparative liquid crystal display device shown in FIG. 7. As a result, it was verified that a displacement amount between the central position C1 and the central position C2 that can increase the directivity was in a range from about −6.5 μm to about +2.5 μm in the transmitting direction.

However, it is preferable to adopt the case where the central positions of the inclined surface and the light gathering surface are matched with each other as described above, because the light can be output so as to travel together in the normal line direction of the output surface of the light guide member more reliably, so that the directivity of the output light can be increased more easily, and the brightness can be increased more easily.

Moreover, the above description explain an example of using the prism sheet having the lens in which the optical path changing portion and the light gathering portion are integral with each other, but the optical path changing portion and the light gathering portion that are structured separately can also be used. However, it is preferable to use the optical path changing portion and the light gathering portion that are integral with each other such as the above-described prism sheet having the lens, because it is possible to easily simplify an operation for incorporating into the backlight unit and an operation for assembling the backlight unit. Also, it is preferable in the point of enabling an operation for the attachment into the backlight unit easily, without carrying out any position adjusting operation for allowing the central positions of the inclined surface of the optical path changing portion and its corresponding light gathering surface of the light gathering portion to be matched with each other.

Moreover, other than the above description, for example, a contact surface of two different optical members that have different refractive indices can also be used as the inclined surface of the optical path changing portion, instead of using the prism sheet. However, the above-described case of using the prism sheet in which the inclined surface is constituted of respective single surfaces of the plurality of the prisms is more preferable, in the point of easily manufacturing the optical path changing portion with excellent handling capabilities, and simplifying an operation for incorporating into the backlight unit. Moreover, the above description also described an example of using a prism that preferably has the isosceles triangular cross section, but the shape of the prism is not limited to this at all, and for example, the prism having a right triangular cross section or other suitable configuration can also be used.

Moreover, the above description disclosed an example of structuring each of the light gathering surfaces of the light gathering portion by the lens surface having the semicircular cross section, but the light gathering portion of the present invention may be provided with the light gathering surface on each of the inclined surfaces of the optical path changing portion, in which the central positions of the pair of the inclined surface and the light gathering surface are matched substantially with each other in the transmitting direction in the light guide member. As the light gathering surface, those with other shapes or structures, for example, a light gathering surface with a convex shape and a prism surface of a light gathering prism can be used. However, the case of using the lens surface having the semicircular cross-section as the light gathering surface is preferable in the point of simplifying the structure of the light gathering portion. Also, it is preferable that, since a portion for outputting the light to the outside has an arc-shaped cross section, the light from the inclined surface is allowed to travel along the normal line direction of the output surface of the light guide member easily, so that the efficiency of utilizing the light from the light source is prevented from being decreased, and the directivity of the output light can be increased easily.

Moreover, the above description explained an example of using the inclined surface that is provided with the plurality of the inclined portions with the inclination angle of α on the surface of the light guide member facing the output surface, but the light guide member of the present invention is not limited to this, and a light guide member with a wedge-shaped cross section having an inclined surface that is inclined at the certain inclination angle of α, and a light guide member with a substantially rectangular-shaped cross section having a parallel surface that is parallel with the output surface can also be used. However, the case of using the inclined surface that is provided with the plurality of the inclined portions at the inclination angle of α is preferable in the point of outputting the efficiency of utilizing the light on the output surface and obtaining the uniform planar light easily.

Moreover, the above descriptions of the first and second preferred embodiments explained examples of using the cold cathode ray tube and the LED (light emitting diode) as the light source, respectively, but the light source of the present invention is not limited to these, and a hot cathode ray tube, other linear light source such as a fluorescent tube, and a point light source such as an EL (electroluminescence) element can also be used.

Moreover, the above description explained an example of using the reflecting plate that is disposed on the lower side of the light guide member, but the reflecting plate of the present invention is not limited to this, and, for example, by applying a paint with high reflectivity onto the reflecting surface that is provided on an inner surface of a box of the liquid crystal display device for storing the liquid crystal display element or the inner surface of the box, the inner surface can also be used as the reflecting plate.

Moreover, other than the above description, an optical member such as a diffusion sheet for adjusting the visibility angle of the liquid crystal display element can also be layered appropriately on the upper side (display surface side) of the liquid crystal display element, for example.

Since the backlight unit according to preferred embodiments of the present invention and the liquid crystal display device including the same can output light so that the light can travel together reliably along the normal line direction of the output surface of the light guide member, the backlight unit that can increase the directivity of the output light and can increase the brightness easily, and the liquid crystal display device including the same can be provided.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight unit comprising:
   a light source;
   a light guide member which includes an input surface from which light from the light source is input and an output surface that outputs the light input from the input surface, leads the light that is input from the input surface toward a predetermined transmitting direction, and outputs the light from the output surface;
   an optical path changing portion which includes a plurality of inclined surfaces that are inclined at a predetermined inclination angle with respect to the output surface, and changes an optical path of the light according to each of the plurality of the inclined surfaces such that the light output from the output surface travels substantially along a normal line direction of the output surface; and
   a light gathering portion including a plurality of light gathering surfaces each of which is disposed for each of the plurality of the inclined surfaces, and gathers light from the corresponding inclined surface toward the normal line direction of the output surface; wherein
   each of central positions of the plurality of the light gathering surfaces in the transmitting direction is substantially aligned with a central position of a corresponding one of the inclined surfaces in the transmitting direction.

2. The backlight unit according to claim 1, wherein the light source includes a point light source, and the plurality of the inclined surfaces included in the optical path changing portion and the plurality of the light gathering surfaces included in the light gathering portion are arranged along arcs including centers positioned at the point light source.

3. The backlight unit according to claim 1, wherein the optical path changing portion includes a prism sheet that is provided with a plurality of prisms including respective surfaces arranged to define the inclined surface.

4. The backlight unit according to claim 1, wherein each of the plurality of the light gathering surfaces includes a lens surface with a semicircular cross section that protrudes toward an outside.

5. The backlight unit according to claim 1, wherein the optical path changing portion and the light gathering portion are integral with each other.

6. A liquid crystal display device comprising a liquid crystal display element and the backlight unit according to claim 1 arranged such that light from the backlight unit is input into the liquid crystal display element.

7. The liquid crystal display device according to claim 6, wherein a polarizing plate is disposed between the light guide member and the liquid crystal display element such that a transmission axis is matched substantially with the transmitting direction of the light guide member.

* * * * *